United States Patent
Zhang et al.

(10) Patent No.: US 11,924,700 B2
(45) Date of Patent: Mar. 5, 2024

(54) L1/L2 BASED CELL SELECTION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/125,093

(22) Filed: Dec. 17, 2020

(65) Prior Publication Data

US 2021/0219199 A1   Jul. 15, 2021

Related U.S. Application Data

(60) Provisional application No. 62/959,823, filed on Jan. 10, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC .. H04W 36/08; H04W 36/0061; H04W 80/02
See application file for complete search history.

(56) References Cited

U.S. PATENT DOCUMENTS

| | | | |
|---|---|---|---|
| 10,187,184 B2 | 1/2019 | Lee et al. | |
| 11,197,258 B2* | 12/2021 | Park | H04L 5/0032 |
| 2017/0373800 A1* | 12/2017 | Lee | H04L 1/1893 |
| 2018/0279182 A1* | 9/2018 | Sang | H04W 74/0833 |
| 2019/0053183 A1* | 2/2019 | Park | H04W 56/0005 |
| 2019/0150101 A1* | 5/2019 | Langereis | H04W 52/365 |
| | | | 455/522 |
| 2020/0015132 A1 | 1/2020 | Liu et al. | |
| 2020/0137745 A1* | 4/2020 | Bachu | H04L 5/0091 |
| 2021/0321308 A1* | 10/2021 | Yang | H04W 12/106 |
| 2022/0070878 A1* | 3/2022 | Lee | H04W 28/26 |

FOREIGN PATENT DOCUMENTS

| | | |
|---|---|---|
| CN | 107148789 A | 9/2017 |
| CN | 108924894 A | 11/2018 |
| CN | 111344980 A | 6/2020 |
| WO | 2019099463 A1 | 5/2019 |

OTHER PUBLICATIONS

International Search Report and Written Opinion—PCT/US2020/065863—ISA/EPO—dated Apr. 20, 2021.

* cited by examiner

*Primary Examiner* — Shukri Taha
(74) *Attorney, Agent, or Firm* — Patterson & Sheridan LLP

(57) ABSTRACT

Aspects of the present disclosure provide apparatus, methods, processing systems, and computer readable mediums for enabling L1 (physical layer) and L2 (medium access control (MAC) layer) inter-cell mobility. In some examples, a user equipment (UE) may receive, from a network entity, at least one of physical layer signaling or MAC layer signaling comprising information for a selected cell. The UE may performing an inter-cell mobility procedure in accordance with the information for the selected cell.

26 Claims, 9 Drawing Sheets

L1/L2 BASED CELL SELECTION

CROSS-REFERENCE TO RELATED APPLICATION(S)

This application claims benefit of and priority to U.S. Provisional Application No. 62/959,823, filed Jan. 10, 2020, which is hereby assigned to the assignee hereof and hereby expressly incorporated by reference herein in its entirety as if fully set forth below and for all applicable purposes.

TECHNICAL FIELD

Aspects of the present disclosure relate to wireless communications, and more particularly, to techniques for enabling layer 1 and/or layer 2 (L1/L2) inter-cell mobility.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

With regard to carrier aggregation, communication links may be through one or more carriers. For example, a base station may use a carrier aggregation of multiple component carriers for transmission of data. The component carriers may include a primary component carrier and one or more secondary component carriers. A primary component carrier may be referred to as a primary cell (PCell) and a secondary component carrier may be referred to as a secondary cell (SCell). For dual connectivity, a special cell on a secondary base station (e.g., SeNB), or a primary secondary cell group (SCG) cell (PSCell) (e.g., a primary cell in a secondary cell group), may support the uplink control channels for the SeNB. The operating states of SCells may be controlled to improve user equipment (UE) performance (e.g., to reduce power consumption in UEs).

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes.

In certain aspects, the disclosure provides a method for wireless communications by a user equipment (UE). In some examples, the method includes receiving, from a network entity, at least one of physical layer signaling or medium access control (MAC) layer signaling comprising information for a selected cell. In some examples, the method includes performing an inter-cell mobility procedure in accordance with the information for the selected cell.

In certain aspects, the disclosure provides a user equipment (UE) comprising a memory and a processor communicatively coupled to the memory. In some examples, the processor and the memory are configured to receive, from a network entity, at least one of physical layer signaling or medium access control (MAC) layer signaling comprising information for a selected cell. In some examples, the processor and the memory are configured to perform an inter-cell mobility procedure in accordance with the information for the selected cell.

In certain aspects, the disclosure provides a user equipment (UE). In some examples, the UE includes a means for receiving, from a network entity, at least one of physical layer signaling or medium access control (MAC) layer signaling comprising information for a selected cell. In some examples, the UE includes a means for performing an inter-cell mobility procedure in accordance with the information for the selected cell.

In certain aspects, the disclosure provides a non-transitory computer-readable storage medium that stores instructions that when executed by a processor of a user equipment (UE) cause the UE to perform a method for wireless communication. In some examples, the method includes receiving, from a network entity, at least one of physical layer signaling or medium access control (MAC) layer signaling comprising information for a selected cell. In some examples, the method also includes performing an inter-cell mobility procedure in accordance with the information for the selected cell.

In certain aspects, the disclosure provides a method for wireless communications by a network entity. In some examples, the method includes transmitting, to a user equipment (UE) via at least one of physical layer signaling or medium access control (MAC) layer signaling, information for a selected cell. In some examples, the method includes performing an inter-cell mobility procedure with the UE in accordance with the information for the selected cell.

In certain aspects, the disclosure provides a network entity that comprises a memory and a processor a processor communicatively coupled to the memory. In some examples, the processor and the memory configured to transmit, to a user equipment (UE) via at least one of physical layer signaling or medium access control (MAC) layer signaling, information for a selected cell. In some examples, the processor and the memory configured to perform an inter-cell mobility procedure with the UE in accordance with the information for the selected cell.

In certain aspects, the disclosure provides a network entity. In some examples, the network entity comprises means for transmitting, to a user equipment (UE) via at least one of physical layer signaling or medium access control (MAC) layer signaling, information for a selected cell. In some examples, the network entity comprise means for performing an inter-cell mobility procedure with the UE in accordance with the information for the selected cell.

In certain aspects, the disclosure provides a non-transitory computer-readable storage medium that stores instructions that when executed by a processor of a network entity cause the network entity to perform a method for wireless communication. In some examples, the method includes transmitting, to a user equipment (UE) via at least one of physical layer signaling or medium access control (MAC) layer signaling, information for a selected cell. In some examples, the method includes performing an inter-cell mobility procedure with the UE in accordance with the information for the selected cell.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
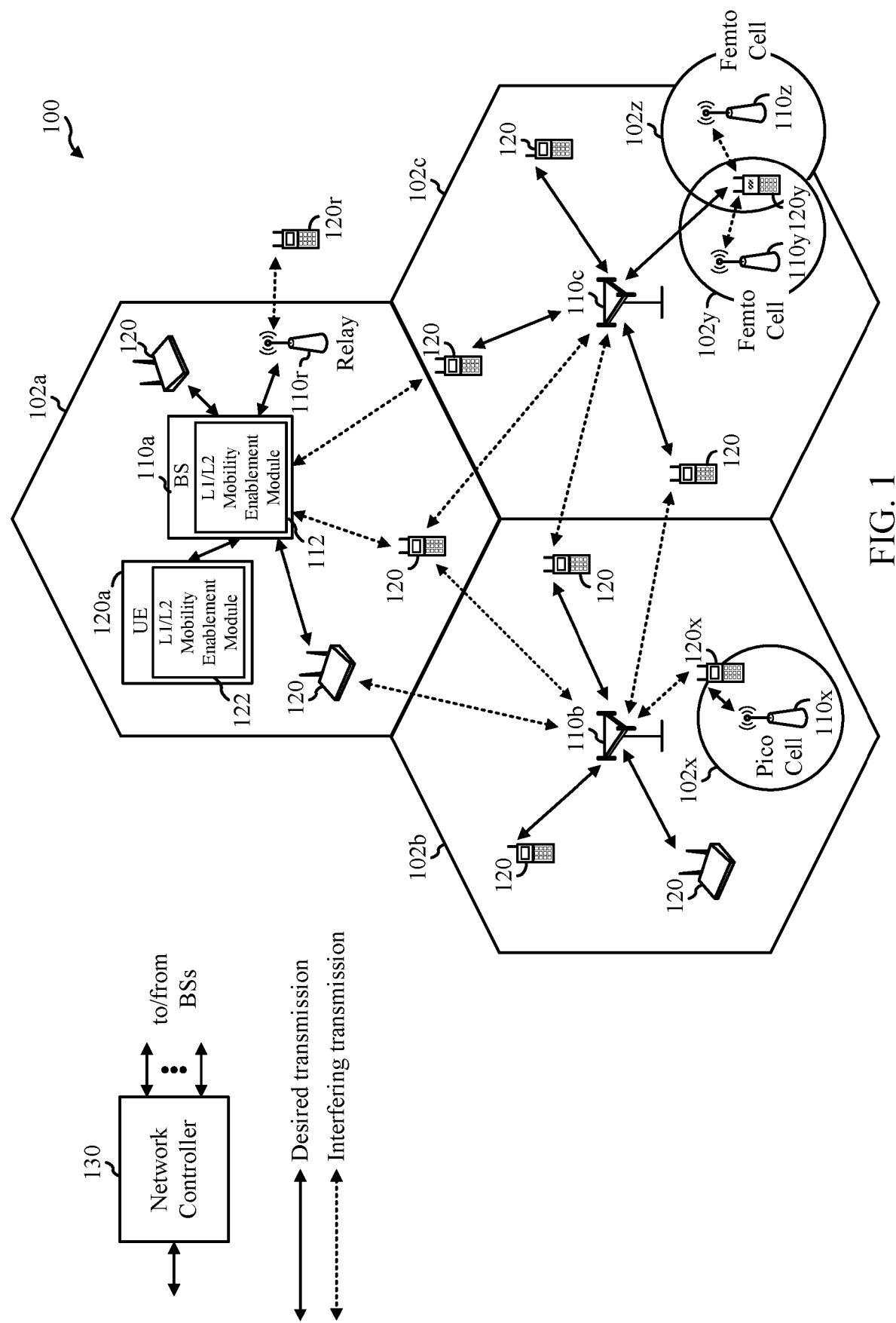
FIG. 1 shows an example wireless communication network in which some aspects of the present disclosure may be performed.

Aspects of the present disclosure provide apparatus, methods, processing systems, and computer readable mediums for enabling L1/L2 inter-cell mobility.

The following description provides examples of enabling L1/L2 inter-cell mobility, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

FIG. 1 illustrates an example wireless communication network 100 in which aspects of the present disclosure may be performed. For example, as shown in FIG. 1, UE 120a may include an L1/L2 mobility enablement module 122 that may be configured to perform (or cause UE 120a to perform) operations 600 of FIG. 6. Similarly, base station 110a may include an L1/L2 mobility enablement module 112 that may be configured to perform (or cause BS 110a to perform) operations 700 of FIG. 7.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
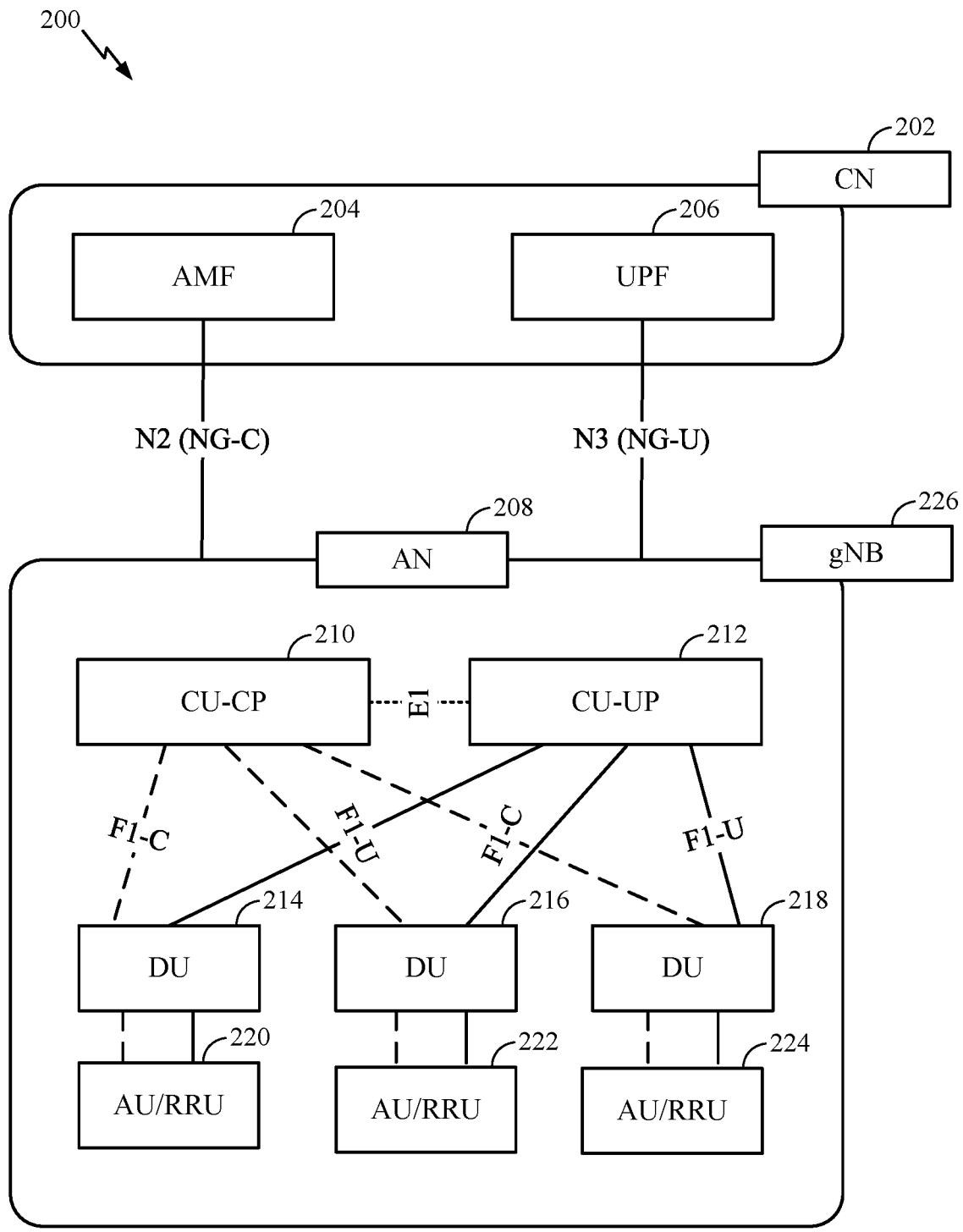
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more antenna/remote radio units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using bearer context management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 210. An inter-DU interface may not be used.

Logical functions may be dynamically distributed in the distributed RAN 200. As will be described in more detail with reference to FIG. 3, the radio resource control (RRC) layer, packet data convergence protocol (PDCP) layer, radio link control (RLC) layer, medium access control (MAC) layer, physical (PHY) layers, and/or radio frequency (RF) layers may be adaptably placed, in the AN and/or UE.

Figure 3:
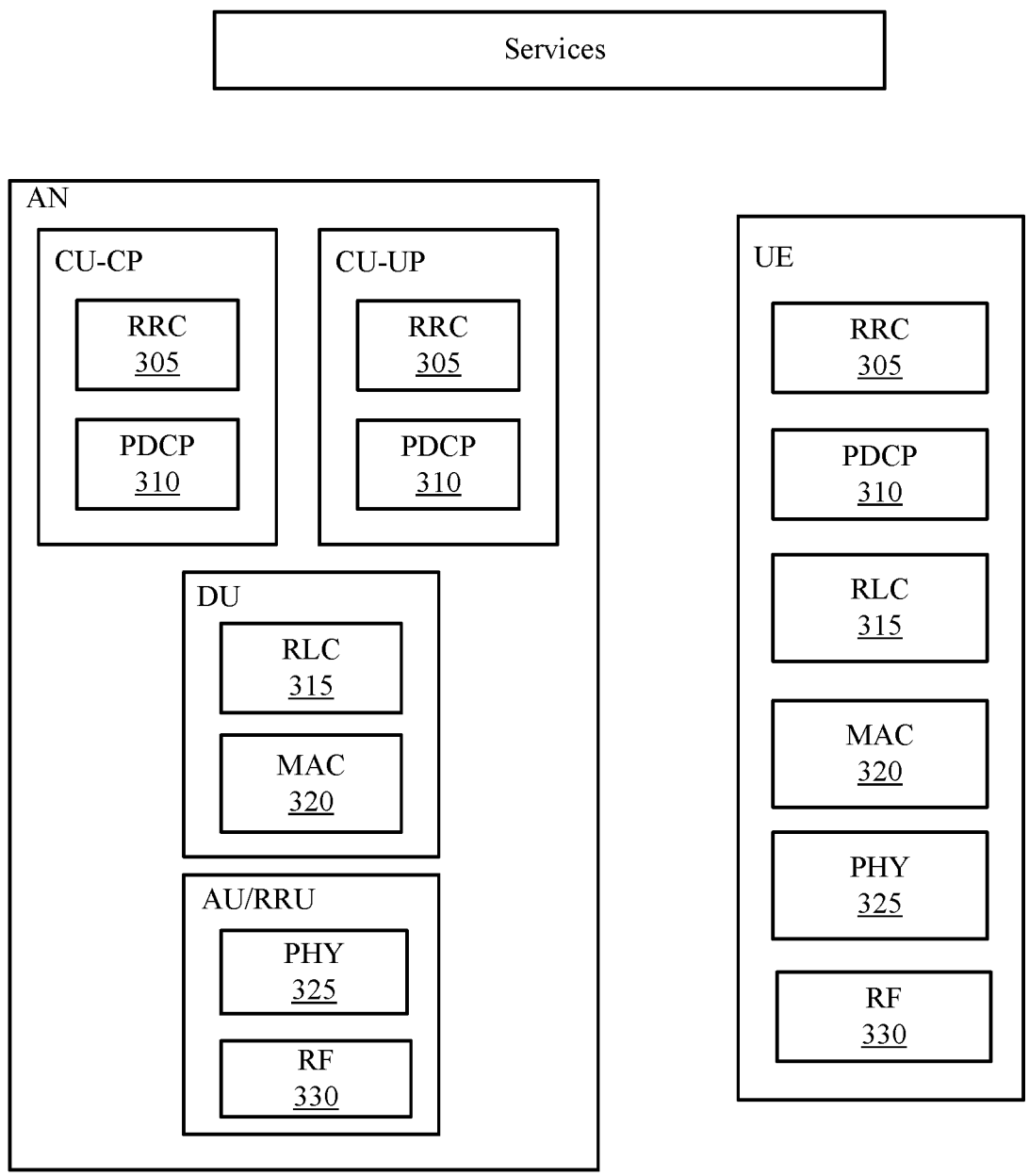
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
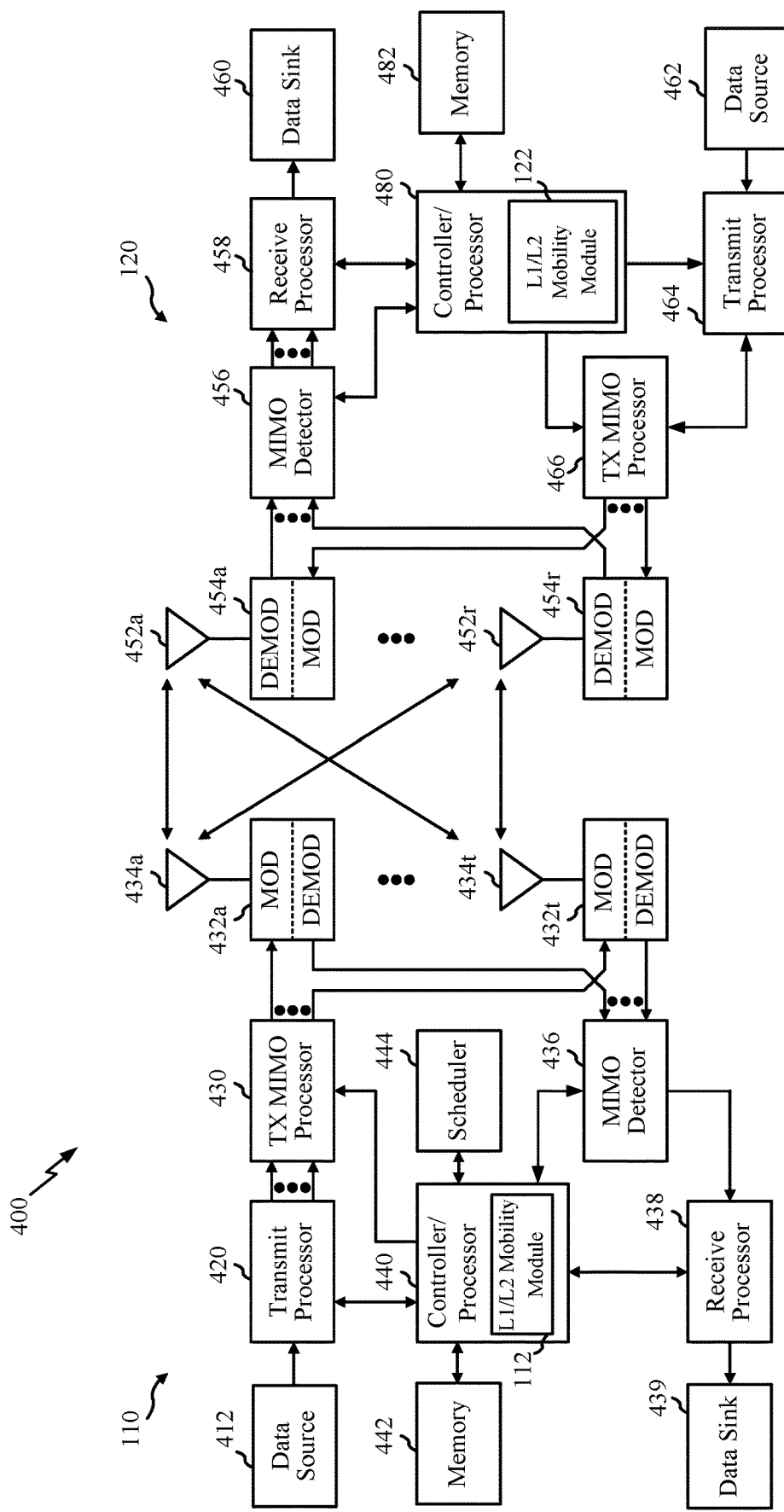
FIG. 4 shows a block diagram illustrating an example base station (BS) and an example user equipment (UE) in accordance with some aspects of the present disclosure.

FIG. 4 shows a block diagram illustrating an example base station (BS) and an example user equipment (UE) in accordance with some aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a-432t. Each modulator in transceivers 432a-432t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 432a-432t may be transmitted via the antennas 434a-434t, respectively.

At the UE 120a, the antennas 452a-452r may receive the downlink signals from the BS 110a and may provide received signals to the demodulators (DEMODs) in transceivers 454a-454r, respectively. Each demodulator in transceivers 454a-454r may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the modulators in transceivers 454a-454r (e.g., for SC-FDM, etc.), and transmitted to the BS 110a. At the BS 110a, the uplink signals from the UE 120a may be received by the antennas 434, processed by the demodulators in transceivers 432a-432t, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The memories 442 and 482 may store data and program codes for BS 110a and UE 120a, respectively. A scheduler 444 may schedule UEs for data transmission on the downlink and/or uplink.

The controller/processor 480 or other processors and modules at the UE 120 may perform or direct the execution of processes for the techniques described herein. As shown in FIG. 4, the controller/processor 480 of the UE 120 has an L1/L2 mobility module 122 that may be configured to perform operations 600 of FIG. 6, while the controller/processor 440 of the BS 110 has an L1/L2 mobility module 112 that may be configured to perform operations 700 of FIG. 7, as discussed in further detail below. Although shown at the controller/processor, other components of the UE or BS may be used to perform the operations described herein.

Figure 5:
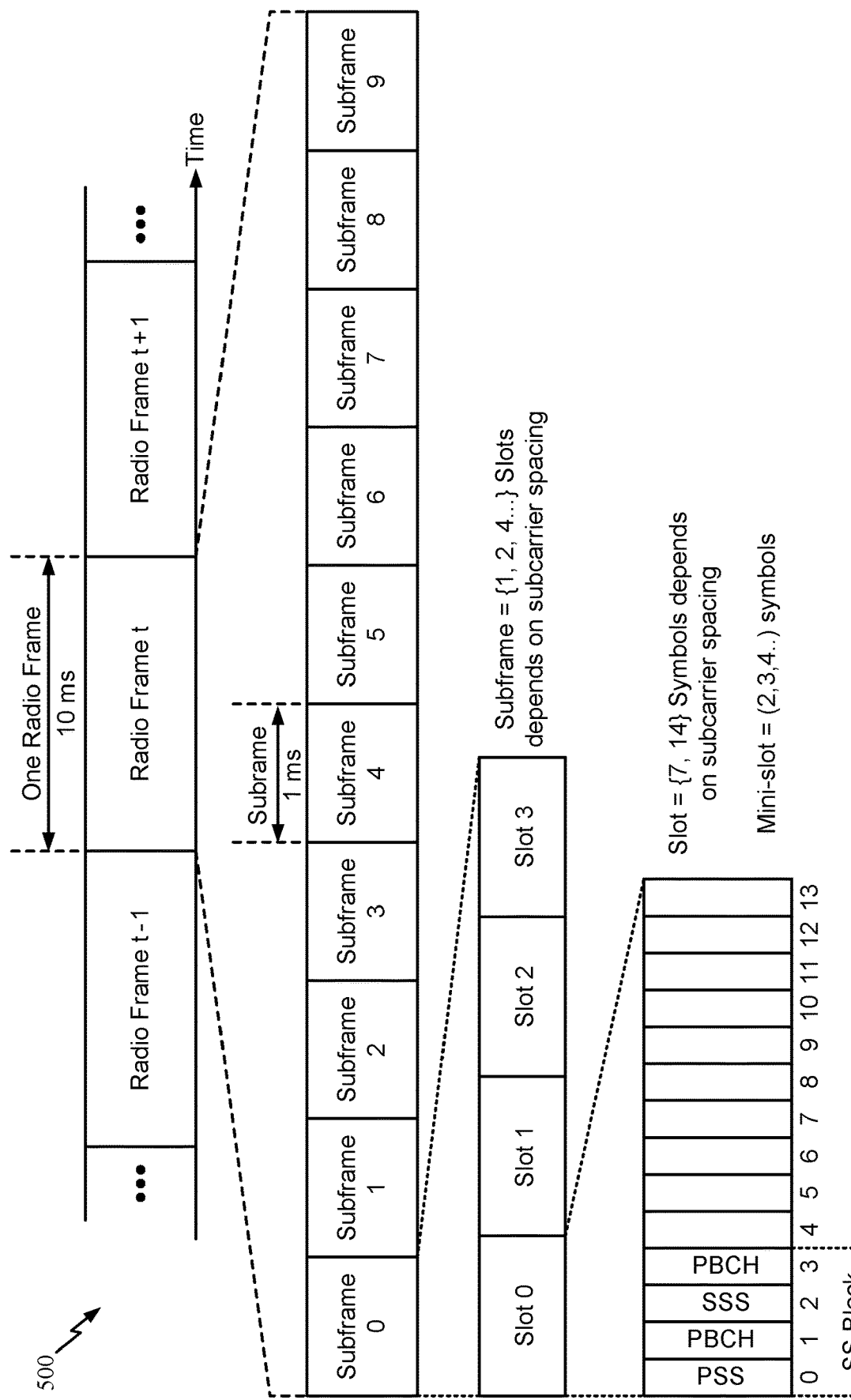
FIG. 5 illustrates an example of a frame format for a telecommunication system, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Signaling and Enabling L/L2 Inter-Cell Mobility

Aspects of the present disclosure provide apparatus, methods, processing systems, and computer readable mediums for enabling L1/L2 inter-cell mobility. For example, a first base station (e.g., base station 110a of FIG. 1) may provide a UE (e.g., UE 120a of FIG. 1) with various signaling configured to enable UE 120a capability for L1/L2-based inter-cell mobility operations. The signaling may be provided via radio resource control (RRC) signaling, a MAC-CE, or downlink control information (DCI). After receiving the signaling from the first base station 110a, the UE 120a may be ready to perform L1/L2 cell selection based on information in a DCI or MAC-CE received from the first base station 110a. Alternatively, if the UE 120a was previously enabled for L1/L2-based inter-cell mobility operations, the UE 120a may signal an indication of the capability to support L1/L2 mobility to the first base station 110a.

If UE 120a supports L1/L2 mobility, the first base station 110a may send an L1/L2 cell selection command to the UE 120a. The L1/L2 cell selection command may include an indication of one or more target cells that the first base station 110a has selected for the UE 120a to communicate with. Upon receipt, the UE 120a may discontinue communications with the first base station 110a and perform a hand over to a second base station (e.g., base station 110b of FIG. 1) associated with the one or more target cells indicated in the L1/L2 cell selection command. Subsequently, the UE 120a may communicate with (e.g., transmits data and control signaling to, and receives data and control signaling from) the second base station 110b.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) may be used to combat severe phase noise. Due to the large subcarrier spacing, the slot length may be very short. In a lower band referred to as FR2 (24.25 GHz to 52.6 GHz) with 120 kHz sub-carrier spacing (SCS), the slot length may be 125 Sec, while in FR4 with 960 kHz, the slot length may be 15.6 Sec.

In multi-beam operation (e.g., involving FR1 and FR2 bands), more efficient uplink/downlink beam management may allow for increased intra-cell and inter-cell mobility (e.g., L1 and/or L2-centric mobility) and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

Some features may facilitate UL beam selection for UEs equipped with multiple panels. For example, UL beam selection may be facilitated through UL beam indication based on a unified TCI framework, enabling simultaneous transmission across multiple panels, and enabling fast panel selection. Further, UE-initiated or L1-event-driven beam management may also reduce latency and the probability that beam failure events occur.

Additional enhancements for multi-TRP deployment may target both FR1 and FR2 bands. These enhancements may improve reliability and robustness for channels other than the PDSCH (e.g., PDCCH, PUSCH, and PUCCH) using multi-TRP and/or multi-panel operations. These enhancements may, in some cases, be related to quasi co-location (QCL) and TCI that may enable inter-cell multi-TRP operations and may allow for simultaneous multi-TRP transmission with multi-panel reception, assuming multi-DCI-based multi-PDSCH reception.

Still further enhancements may support single frequency networks (SFNs) in high speed environments (e.g., in the high speed train (HST) scenario). These may include QCL assumptions for demodulation reference signals (DMRS), such as multiple QCL assumptions for the same DMRS ports and/or targeting downlink-only transmission. In some cases, the enhancements may specify a QCL or QCL-like relation, including applicable QCL types and associated requirements, between downlink and uplink signals by using a unified TCI framework.

In Rel-15 and Rel-16, each serving cell may have an RRC-configured serving cell ID and an RRC-configured physical cell indicator (PCI). A UE may also acquire the PCI from the synchronization signal block (SSB) of the serving cell.

As background, wireless communication networks may be designed based on profiles that clearly indicate periods of communication inactivity and activity. In this implementation, a UE may enter RRC connected mode(s) during periods of activity and enter RRC idle mode during inactive periods, which may provide significant battery and system resource savings. Accordingly, a UE may enter into an RRC connected mode during times of relatively high communication activity, and enter into an RRC idle mode during times of relatively low communication (or no communication) activity.

In L1 (e.g., physical layer)/L2 (e.g., medium access control (MAC) layer) based inter-cell mobility, each possible cell selection scenario, cell selection type, and corresponding signaling may be specified. For example, L1/L2 based cell selection may be applied to cell selection scenarios in RRC connected/idle mode, where the scenarios include: (i) intra-gNB-DU cell selection, (ii) inter-gNB-DU cell selection, and (iii) inter-gNB-CU cell selection. Moreover, in each cell selection scenario, L1/L2 based cell selection may be applied to the following cell selection types: (i) L1/L2 based SCell addition and/or removal, (ii) L1/L2 based SPCell reselection, (iii) L1 based SCell activation and/or deactivation, and (iv) L1/L2 based primary secondary cell (PSCell) addition and/or removal. Thus, L1/L2 based signaling may be provided for each combination of cell selection scenario and cell selection type.

Example Intra-gNB-DU Cell Selection Signaling

In a first embodiment, the UE 120a may receive an L1/L2 cell selection command from the first base station 110a providing an indication of a selected cell that is provided by a distributed unit (DU) that operates under the first base station 110a. For example, in this case, the cell is changing but the DU may be a DU with which the UE 120a is already in communication. The cell selection command may be provided via DCI or MAC-CE. In this embodiment, the L1/L2 cell selection command provides information for addition or removal of an SCell. For example, the L1/L2 cell selection command may include a serving cell ID or corresponding PCI(s) for the SCell to be added or removed. In some examples, if the SCell is being added, the L1/L2 cell selection command may include serving cell configuration information about the SCell, including one or more of: a synchronization signal block (SSB) configuration, a subcarrier spacing (SCS), remaining minimum system information (RMSI), a random access configuration, rate matching patterns, a DL and/or UL TDD configuration, a supplementary uplink (SUL) configuration, DL and/or UL cell frequency locations, DL and/or UL bandwidth part (BWP) configuration, PDCCH/PDSCH/PUSCH/PUCCH/SRS configuration, channel state information (CSI) measurement and/or report configuration, timing advance group (TAG) ID, cross-carrier scheduling configuration, an indication of whether the serving cell is allowed to be mapped to a logic channel ID for one or more of UL and DL traffic, and any other suitable information.

In a second embodiment, the UE 120a receives an L1/L2 cell selection command from the first base station 110a providing an indication of a selected cell that is provided by a distributed unit (DU) that operates under the first base station 110a. However, in this embodiment, the L1/L2 cell selection command provides information for reselection of one or more of an SPCell, a PCell, or a primary secondary cell (PSCell) (e.g., in dual connectivity scenarios). In this example, the L1/L2 cell selection command may include a serving cell ID or corresponding PCI(s) for the new SPCell, PCell, or PSCell.

In some examples, the L1/L2 cell selection command may also include serving cell configuration information about the new SPCell, PCell, or PSCell, including one or more of: an SSB configuration, an SCS configuration, an RMSI, a random access configuration, rate matching patterns, a DL and/or UL TDD configuration, an SUL configuration, DL and/or UL cell frequency locations, DL and/or UL BWP configurations, one or more of a PDCCH, PDSCH, PUSCH, PUCCH, or SRS configuration, CSI measurement and/or report configuration, TAG ID, cross-carrier scheduling configuration, an indication of whether the serving cell is allowed to be mapped to a logic channel ID for one or more of UL and DL traffic, security key and ciphering and/or integrity protection algorithms, and any other suitable information.

In a third embodiment, the UE 120a receives an L1 cell selection command from the first base station 110a providing an indication of a selected cell that is provided by a distributed unit (DU) that operates under the first base station 110a. As such, the cell selection command may be provided via DCI or any other suitable L1 messaging. Here, the L1 cell selection command provides information for activation or deactivation of an SCell. In this example, the L1 cell selection command may include a serving cell ID or corresponding PCI(s) for the activated or deactivated SCell. In some examples, the SCell ID may be provided in a bit map, wherein each bit in the bit map corresponds to an SCell ID. As such, the SCell being activated or deactivated can be identified by the UE 120a based on the serving cell ID or PCI(s). In some examples, a binary bit in the bit map may be set to indicate whether the corresponding SCell ID is activated or deactivated (e.g., a '1' may indicate activated, while a '0' may indicate deactivated, or vice versa).

Example Inter-gNB-DU Cell Selection Signaling

In a first embodiment, the UE 120a receives an L1/L2 cell selection command from the first base station 110a providing an indication of a selected cell that is provided by a new DU that operates under a central unit (CU) that the UE 120a is already communicating with. As such, the UE 120a may require additional information to set up radio link control (RLC) bearer and logic channel setup for the DL and UL communication with the new DU.

In this embodiment, the L1/L2 cell selection command provides information for addition or removal of an SCell. For example, the L1/L2 cell selection command may include a serving cell ID or corresponding PCI(s) for the SCell to be added or removed. In some examples, if the SCell is being added, the L1/L2 cell selection command may include serving cell configuration information about the SCell, including one or more of: an SSB configuration, an SCS configuration, an RMSI, a random access configuration, rate matching patterns, a DL and/or UL TDD configuration, an SUL configuration, DL and/or UL cell frequency locations, DL and/or UL BWP configuration, one or more of a PDCCH, PDSCH, PUSCH, PUCCH, or SRS configuration, CSI measurement and/or report configuration, TAG ID, cross-carrier scheduling configuration, an indication of whether the serving cell is allowed to be mapped to a logic channel ID for one or more of UL and DL traffic, and any other suitable information.

Moreover, as noted previously, additional information to set up RLC bearer and logic channel may require that the L1/L2 cell selection command provide additional information to the UE 120*a*. For example, the additional information may include an indication of a radio bearer served by each RLC bearer. For example, a signaling radio bearer (SRB) ID or a dedicated radio bearer (DRB) ID served by each RLC bearer. The additional information may also include a configuration per RLC bearer. For example, the configuration may indicate whether the RLC bearer is DL or UL, acknowledged mode (AM) or unacknowledged mode (UM), operation parameters for AM or UM, and a corresponding logic channel ID. The additional information may also include configuration per logic channel, for one or more of UL or DL communications. For example, the configuration may provide: priority of one or more logic channels when multiplexing different logic channels into one MAC PDU, allowed serving cells for each of the one or more logic channels, and a scheduling request ID associated with each of the one or more logic channels.

In a second embodiment, the UE 120*a* receives an L1/L2 cell selection command from the first base station 110*a* providing an indication of a selected cell that is provided by a new DU that operates under an existing central unit (CU). However, in this embodiment, the L1/L2 cell selection command provides information for reselection of one or more of an SPCell, a PCell, or a primary secondary cell (PSCell) (e.g., in dual connectivity scenarios). In this example, the L1/L2 cell selection command may include a serving cell ID or corresponding PCI(s) for the new SPCell, PCell, or PSCell.

In some examples, the L1/L2 cell selection command may also include serving cell configuration information about the new SPCell, PCell, or PSCell, including one or more of: an SSB configuration, an SCS configuration, RMSI, a random access configuration, rate matching patterns, a DL and/or UL TDD configuration, an SUL configuration, DL and/or UL cell frequency locations, DL and/or UL BWP configuration, one or more of a PDCCH, PDSCH, PUSCH, PUCCH, or SRS configuration, CSI measurement and/or report configuration, TAG ID, cross-carrier scheduling configuration, an indication of whether the serving cell is allowed to be mapped to a logic channel ID for one or more of UL and DL traffic, security key and ciphering and/or integrity protection algorithms, and any other suitable information.

In some examples, additional information to set up RLC bearer and logic channel may require that the L1/L2 cell selection command provide additional information to the UE 120*a*. For example, the additional information may include an indication of a radio bearer served by each RLC bearer. For example, a signaling radio bearer (SRB) ID or a dedicated radio bearer (DRB) ID served by each RLC bearer. The additional information may also include a configuration per RLC bearer. For example, the configuration may indicate whether the RLC bearer is DL or UL, acknowledged mode (AM) or unacknowledged mode (UM), operation parameters for AM or UM, and a corresponding logic channel ID. The additional information may also include configuration per logic channel, for one or more of UL or DL communications. For example, the configuration may provide: priority of one or more logic channels when multiplexing different logic channels into one MAC PDU, allowed serving cells for each of the one or more logic channels, and a scheduling request ID associated with each of the one or more logic channels.

In a third embodiment, the UE 120*a* receives an L1 cell selection command from the first base station 110*a* providing an indication of a selected cell that is provided by a new DU that operates under an existing central unit (CU). As such, the cell selection command may be provided via DCI or any other suitable L1 messaging. Here, the L1 cell selection command provides information for activation or deactivation of an SCell. In this example, the L1 cell selection command may include a serving cell ID or corresponding PCI(s) for the activated or deactivated SCell. In some examples, the SCell ID may be provided in a bit map, wherein each bit in the bit map corresponds to an SCell ID. As such, the SCell being activated or deactivated can be identified by the UE 120*a* based on the serving cell ID or PCI(s). In some examples, a binary bit in the bit map may be set to indicate whether the corresponding SCell ID is activated or deactivated (e.g., a '1' may indicate activated, while a '0' may indicate deactivated, or vice versa).

In the case of activation of an SCell, additional information to set up RLC bearer and logic channel may require that the L1 cell selection command provide additional information to the UE 120*a*. For example, the additional information may include an indication of a radio bearer served by each RLC bearer. For example, a signaling radio bearer (SRB) ID or a dedicated radio bearer (DRB) ID served by each RLC bearer. The additional information may also include a configuration per RLC bearer. For example, the configuration may indicate whether the RLC bearer is DL or UL, acknowledged mode (AM) or unacknowledged mode (UM), operation parameters for AM or UM, and a corresponding logic channel ID. The additional information may also include configuration per logic channel, for one or more of UL or DL communications. For example, the configuration may provide: priority of one or more logic channels when multiplexing different logic channels into one MAC PDU, allowed serving cells for each of the one or more logic channels, and a scheduling request ID associated with each of the one or more logic channels.

Example Inter-gNB-CU Cell Selection Signaling

In a first embodiment, the UE 120*a* receives an L1/L2 cell selection command from the first base station 110*a* providing an indication of a selected cell that is provided by a new CU. As such, the UE 120*a* may require additional information to set up RLC bearer and logic channel setup for the DL and UL communication with a new DU corresponding to the new CU.

In this embodiment, the L1/L2 cell selection command provides information for addition or removal of an SCell. For example, the L1/L2 cell selection command may include a serving cell ID or corresponding PCI(s) for the SCell to be added or removed.

In some examples, if the SCell is being added, the L1/L2 cell selection command may include service data adaptation protocol (SDAP) information and packet data adaptation protocol (PDAP) information for setting up DL and UL communications between the UE 120*a* and the new CU. In some examples, the SDAP and PDAP information may include mapping between a quality of service (QoS) flow to a data radio bearer.

In some examples, the L1/L2 cell selection command may include RLC bearer and logic channel setup for DL and UL communications with a new DU corresponding to the new CU of the added SCell. For example, additional information to set up RLC bearer and logic channel may require that the L1/L2 cell selection command provide additional information to the UE 120*a*. For example, the additional information may include an indication of a radio bearer served by each RLC bearer. For example, an SRB ID or a DRB ID served by each RLC bearer. The additional information may also include a configuration per RLC bearer. For example, the configuration may indicate whether the RLC bearer is DL or UL, an AM mode or a UM mode, operation parameters for AM or UM, and a corresponding logic channel ID. The additional information may also include configuration per logic channel, for one or more of UL or DL communications. For example, the configuration may provide: priority of one or more logic channels when multiplexing different logic channels into one MAC PDU, allowed serving cells for each of the one or more logic channels, and a scheduling request ID associated with each of the one or more logic channels.

In some examples, the L1/L2 cell selection command may include information about the new cell group containing the added SCell. For example, the L1/L2 cell selection command may include an ID of a new cell group, common MAC and PHY parameters applied to the new cell group, SPCell ID and each SCell ID of the new cell group, configuration of each serving cell, including both the SPCell and the SCell of the new cell group. Additionally, the L1/L2 cell selection command may include serving cell configuration information about the added SCell, including one or more of: an SSB configuration, an SCS, an RMSI, a random access configuration, rate matching patterns, a DL and/or UL TDD configuration, an SUL configuration, DL and/or UL cell frequency locations, DL and/or UL BWP configuration, one or more of an PDCCH, PDSCH, PUSCH, PUCCH, or SRS configuration, CSI measurement and/or report configuration, TAG ID, cross-carrier scheduling configuration, an indication of whether the serving cell is allowed to be mapped to a logic channel ID for one or more of UL and DL traffic, and any other suitable information.

In a second embodiment the UE 120*a* receives an L1/L2 cell selection command from the first base station 110*a* providing an indication of SPCell reselection. In this example, the L1/L2 cell selection command may include a serving cell ID or corresponding PCI(s) for the new SPCell, as well as security key and ciphering and/or integrity protection algorithms for the new SPCell.

In some examples, the L1/L2 cell selection command may include SDAP information and PDAP information for setting up DL and UL communications between the UE 120*a* and the new SPCell. In some examples, the SDAP and PDAP information may include mapping between a QoS flow to a data radio bearer.

In some examples, the L1/L2 cell selection command may include RLC bearer and logic channel setup for the DL and UL communications for a new DU associated with a new CU of the new SPCell. As such, the L1/L2 cell selection command may include an indication of a radio bearer served by each RLC bearer. For example, an SRB ID or a DRB ID served by each RLC bearer. The additional information may also include a configuration per RLC bearer. For example, the configuration may indicate whether the RLC bearer is DL or UL, an indication of an AM or UM, operation parameters for AM or UM, and a corresponding logic channel ID. The additional information may also include configuration per logic channel, for one or more of UL or DL communications. For example, the configuration may provide: priority of one or more logic channels when multiplexing different logic channels into one MAC PDU, allowed serving cells for each of the one or more logic channels, and a scheduling request ID associated with each of the one or more logic channels.

In some examples, the L1/L2 cell selection command may include additional information about the new cell group containing the new SPCell. For example, the additional information may include an ID of the new cell group, common MAC and PHY parameters that are applied throughout the new cell group, and SPCell ID and each SCell IS of the new cell group, configuration of each serving cell, including both SPCell and SCell, of the new cell group. Moreover, the additional information may also include one or more of: an SSB configuration, an SCS configuration, RMSI, a random access configuration, rate matching patterns, a DL and/or UL TDD configuration, an SUL configuration, DL and/or UL cell frequency locations, DL and/or UL BWP configuration, one or more of a PDCCH, PDSCH, PUSCH, PUCCH, or SRS configuration, CSI measurement and/or report configuration, TAG ID, cross-carrier scheduling configuration, an indication of whether the serving cell is allowed to be mapped to a logic channel ID for one or more of UL and DL traffic.

In a third embodiment the UE 120*a* receives an L1/L2 cell selection command from the first base station 110*a* configured for addition or removal of a PSCell. In this example, the L1/L2 cell selection command may include a serving cell ID or corresponding PCI(s) for the new SPCell, as well as security key and ciphering and/or integrity protection algorithms for the new SPCell.

In some examples, the L1/L2 cell selection command may include SDAP information and PDAP information for setting up DL and UL communications between the UE 120*a* and the new SPCell. In some examples, the SDAP and PDAP information may include mapping between a QoS flow to a data radio bearer.

In some examples, additional information to set up RLC bearer and logic channel for a new DU and a new corresponding CU may require that the L1/L2 cell selection command provide additional information to the UE 120*a*. For example, the additional information may include an indication of a radio bearer served by each RLC bearer. For example, an SRB ID or a DRB ID served by each RLC bearer. The additional information may also include a configuration per RLC bearer. For example, the configuration may indicate whether the RLC bearer is DL or UL, an indication of an AM or UM, operation parameters for AM or UM, and a corresponding logic channel ID. The additional information may also include configuration per logic channel, for one or more of UL or DL communications. For example, the configuration may provide: priority of one or more logic channels when multiplexing different logic channels into one MAC PDU, allowed serving cells for each of the one or more logic channels, and a scheduling request ID associated with each of the one or more logic channels.

In some examples, the L1/L2 cell selection command may include additional information about the new cell group containing the new SPCell. For example, the additional information may include an ID of the new cell group, common MAC and PHY parameters that are applied throughout the new cell group, and SPCell ID and each SCell IS of the new cell group, configuration of each serving cell, including both SPCell and SCell, of the new cell group. Moreover, the additional information may also include one or more of: an SSB configuration, an SCS configuration, RMSI, a random access configuration, rate matching patterns, a DL and/or UL TDD configuration, an SUL configuration, DL and/or UL cell frequency locations, DL and/or UL BWP configuration, one or more of a PDCCH, PDSCH, PUSCH, PUCCH, or SRS configuration, CSI measurement and/or report configuration, TAG ID, cross-carrier scheduling configuration, an indication of whether the serving cell is allowed to be mapped to a logic channel ID for one or more of UL and DL traffic.

Figure 6:
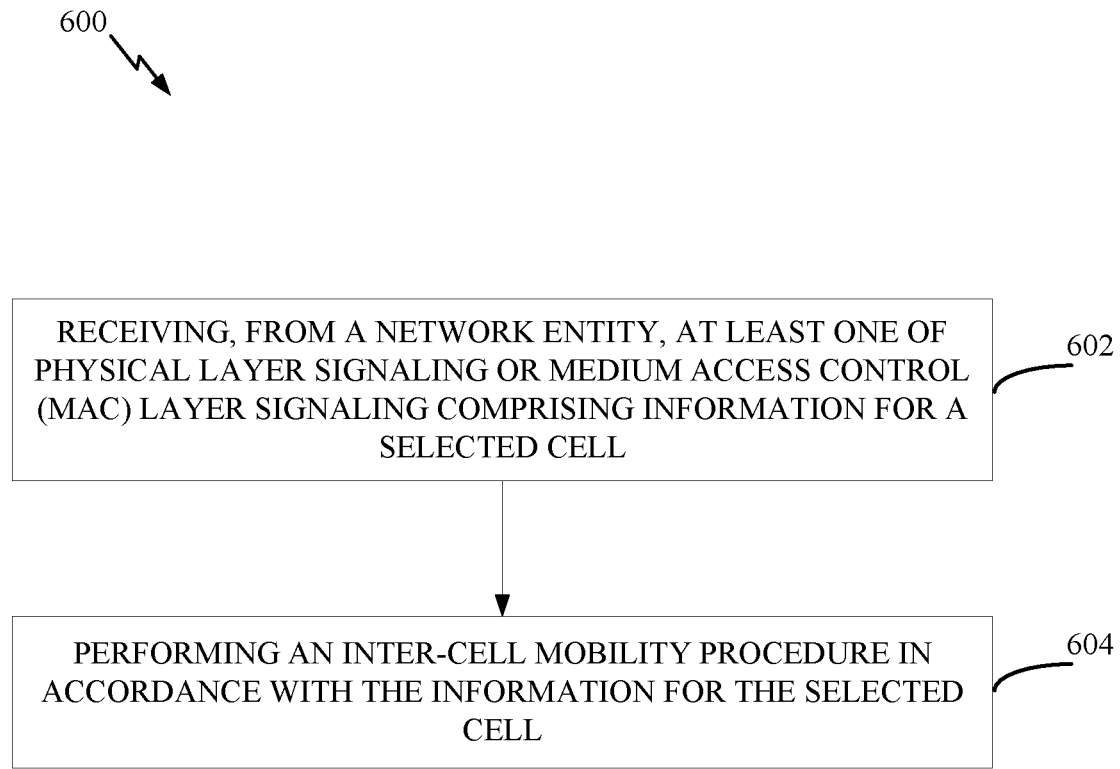
FIG. 6 illustrates example operations for wireless communication by a user equipment (UE), in accordance with some aspects of the present disclosure.

FIG. 6 illustrates example operations 600 that may be performed by a UE (e.g., UE 120a of FIG. 1) to perform L1/L2 based cell (e.g., SCell) addition and/or removal, L1/L2 based cell (e.g., PSCell) reselection, L1 based cell (SCell) activation and/or deactivation, or L1/L2 based cell (e.g., PSCell) addition and/or removal, in accordance with certain aspects of the present disclosure.

As illustrated, operations 600 begin, at 602, where the UE receives, from a network entity, at least one of physical layer signaling or medium access control (MAC) layer signaling comprising information for a selected cell.

At 604, the UE performs an inter-cell mobility procedure in accordance with the information for the selected cell.

In certain aspects, the physical layer or MAC layer signaling comprises at least one of downlink control information (DCI) or a MAC control element (MAC CE) comprising the information for the selected cell.

In certain aspects, the selected cell comprises a cell operated under a first distributed unit (DU) of a first central unit (CU) of a base station, the first DU and the first CU currently serving the UE, a cell operated under a second DU of the first CU of the base station, the first DU and the first CU currently serving the UE, or a cell operating under a third DU of a second CU of the first base station, the first DU and the first CU currently serving the UE.

In certain aspects, the information for the selected cell comprises at least one of a synchronization signal block (SSB) configuration, a subcarrier spacing (SCS) configuration, remaining minimum system information (RMSI), a random access configuration, or one or more rate matching patterns.

In certain aspects, the information for the selected cell comprises at least one of a downlink and uplink time division duplex (TDD) configuration, a supplemental uplink (SUL) configuration, downlink and uplink cell frequency locations, a downlink and uplink bandwidth part (BWP) configuration, a configuration for at least one of a physical downlink control channel (PDCCH), physical downlink shared channel (PDSCH), physical uplink shared channel (PUSCH), physical uplink control channel (PUCCH), or sounding reference signal (SRS), a channel state information (CSI) measurement and reporting configuration, a timing advance group (TAG) identifier (ID), or a cross-carrier scheduling configuration.

In certain aspects, the inter-cell mobility procedure comprises an addition or removal of the selected cell as a secondary cell (SCell), and the information for the selected cell comprises at least one of a serving cell identifier (ID) or a physical cell ID (PCI) for the SCell.

In certain aspects, the inter-cell mobility procedure comprises reselection of at least one of a primary cell (PCell) or a primary secondary cell group (SCG) cell (PSCell), and the information for the selected cell comprises at least one of a serving cell identifier (ID) or a physical cell ID (PCI) for PCell or PSCell.

In certain aspects, the information comprises at least one of a security key, ciphering, or integrity protection algorithm at least for the cell group of the reselected PCell or PSCell.

In certain aspects, the inter-cell mobility procedure comprises activation or deactivation of one or more secondary cells (SCells), and the information comprises a bit map indicating which of the SCells are activated or deactivated.

In certain aspects, the selected cell comprises one of: (i) the cell operated under the second DU of the first CU of the base station, or (ii) the cell operating under the third DU of the second CU of the first base station, and wherein the information comprises at least one of a radio bearer served by each radio link control (RLC) bearer, a configuration per RLC bearer, or a configuration per logic channel.

In certain aspects, the selected cell comprises the cell operating under the third DU of a second CU of the first base station, and wherein the information comprises at least one of a service data adaptation protocol (SDAP) and a packet data convergence protocol (PDCP) for configuring uplink and downlink communications between the UE and the second CU, and a mapping between a quality of service (QoS) flow to a data radio bearer (DRB).

In certain aspects, the inter-cell mobility procedure comprises at addition or removal of the selected cell as a Primary secondary cell group (SCG) cell (PSCell), and the information for the selected cell comprises at least one of a serving cell identifier (ID) or a physical cell ID (PCI) for the PSCell.

Figure 7:
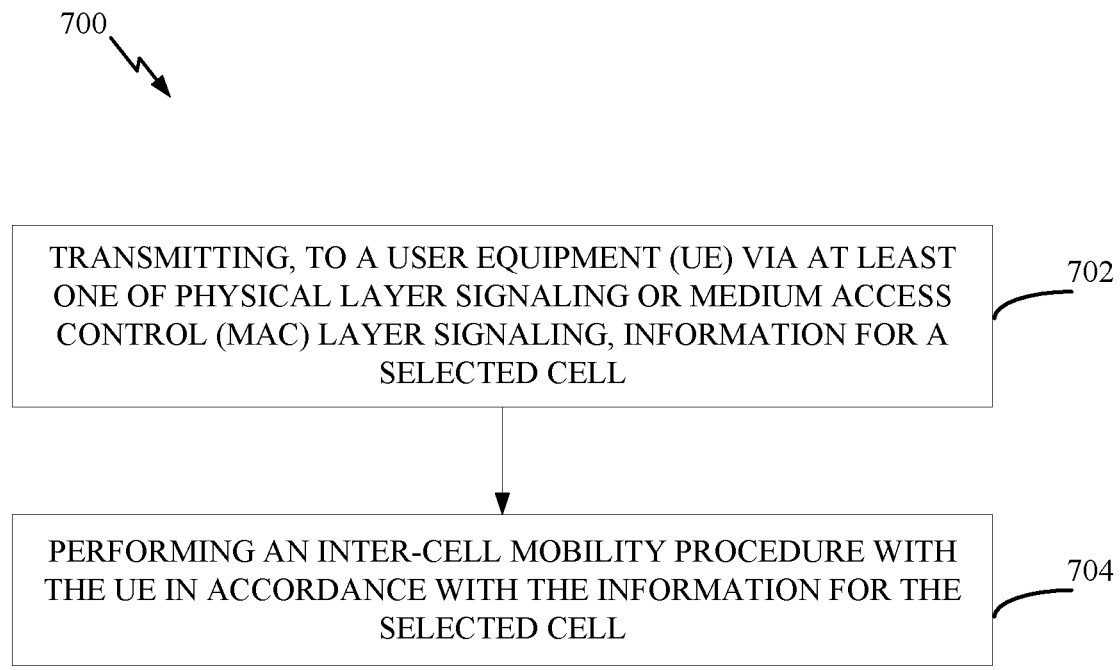
FIG. 7 illustrates an example operations for wireless communication by a network entity, in accordance with some aspects of the present disclosure.

FIG. 7 illustrates example operations that may be performed by a network entity (e.g., base station 110a) to perform L1/L2 based cell (e.g., SCell) addition and/or removal, L1/L2 based cell (e.g., PSCell) reselection, L1 based cell (SCell) activation and/or deactivation, or L1/L2 based cell (e.g., PSCell) addition and/or removal, in accordance with certain aspects of the present disclosure.

As illustrated, operations 700 begin, at 702, where the network entity transmits, to a user equipment (UE) via at least one of physical layer signaling or medium access control (MAC) layer signaling, information for a selected cell.

At 704, the network entity performs an inter-cell mobility procedure with the UE in accordance with the information for the selected cell.

In certain aspects, the physical layer or MAC layer signaling comprises at least one of downlink control information (DCI) or a MAC control element (MAC CE) indicating the cell selection information.

In certain aspects, the selected cell comprises: a cell operated under a first distributed unit (DU) of a first central unit (CU) of a base station, the first DU and the first CU currently serving the UE, a cell operated under a second DU of the first CU of the base station, the first DU and the first CU currently serving the UE, or a cell operating under a third DU of a second CU of the first base station, the first DU and the first CU currently serving the UE.

In certain aspects, the information for the selected cell comprises at least one of: a synchronization signal block (SSB) configuration, a subcarrier spacing (SCS) configuration, a remaining minimum system information (RMSI), a random access configuration, or one or more rate matching patterns.

In certain aspects, the information for the selected cell comprises at least one of a downlink and uplink time division duplex (TDD) configuration, a supplemental uplink (SUL) configuration, downlink and uplink cell frequency locations, a downlink and uplink bandwidth part (BWP) configuration, a configuration for at least one of a physical downlink control channel (PDCCH), physical downlink shared channel (PDSCH), physical uplink shared channel (PUSCH), physical uplink control channel (PUCCH), or sounding reference signal (SRS), a channel state information (CSI) measurement and reporting configuration, a timing advance group (TAG) identifier (ID), or a cross-carrier scheduling configuration.

In certain aspects, the inter-cell mobility procedure comprises at addition or removal of the selected cell as a secondary cell (SCell), and the information for the selected cell comprises at least one of a serving cell identifier (ID) or a physical cell ID (PCI) for the SCell.

In certain aspects, the inter-cell mobility procedure comprises reselection of at least one of a primary cell (PCell) or a Primary secondary cell group (SCG) cell (PSCell), and the information for the selected cell comprises at least one of a serving cell identifier (ID) or a physical cell ID (PCI) for PCell or PSCell.

In certain aspects, the information comprises at least one of a security key, ciphering, or integrity protection algorithms at least for the cell group of the new PCell or PSCell.

In certain aspects, the inter-cell mobility procedure comprises activation or deactivation of one or more secondary cells (SCells), and the information comprises a bit map indicating which of the SCells are activated or deactivated.

In certain aspects, the selected cell comprises one of: (i) the cell operated under the second DU of the first CU of the base station, or (ii) the cell operating under the third DU of the second CU of the first base station, and wherein the information comprises at least one of: a radio bearer served by each radio link control (RLC) bearer, a configuration per RLC bearer, or a configuration per logic channel.

In certain aspects, the selected cell comprises the cell operating under the third DU of a second CU of the first base station, and wherein the information comprises at least one of: a service data adaptation protocol (SDAP) and a packet data convergence protocol (PDCP) for configuring uplink and downlink communications between the UE and the second CU, and a mapping between a quality of service (QoS) flow to a data radio bearer (DRB).

In certain aspects, the selected cell comprises the cell operating under the third DU of the second CU of the first base station, and wherein: the inter-cell mobility procedure comprises at addition or removal of the selected cell as a Primary secondary cell group (SCG) cell (PSCell), and the information for the selected cell comprises at least one of a serving cell identifier (ID) or a physical cell ID (PCI) for the PSCell.

In some embodiments, the UE may report one capability on general L1/L2-based inter-cell mobility. The reported capability may be applicable to each of the operating modes discussed above. In some embodiments, the UE may report capabilities associated with each operating mode for L1/L2-based mobility.

A network entity (e.g., gNodeB) may indicate, to the UE, the enablement of a corresponding L1/L2-based inter-cell mobility operation via various signaling mechanisms. The indication may be included, for example, in radio resource control (RRC) signaling, a MAC-CE, or a downlink control information (DCI). In some embodiments, the indication may be based on the configuration of an RRC parameter. After receiving the enablement indication from the network entity, the UE may be ready to perform L1/L2 cell selection based on a received DCI or MAC-CE.

Figure 8:
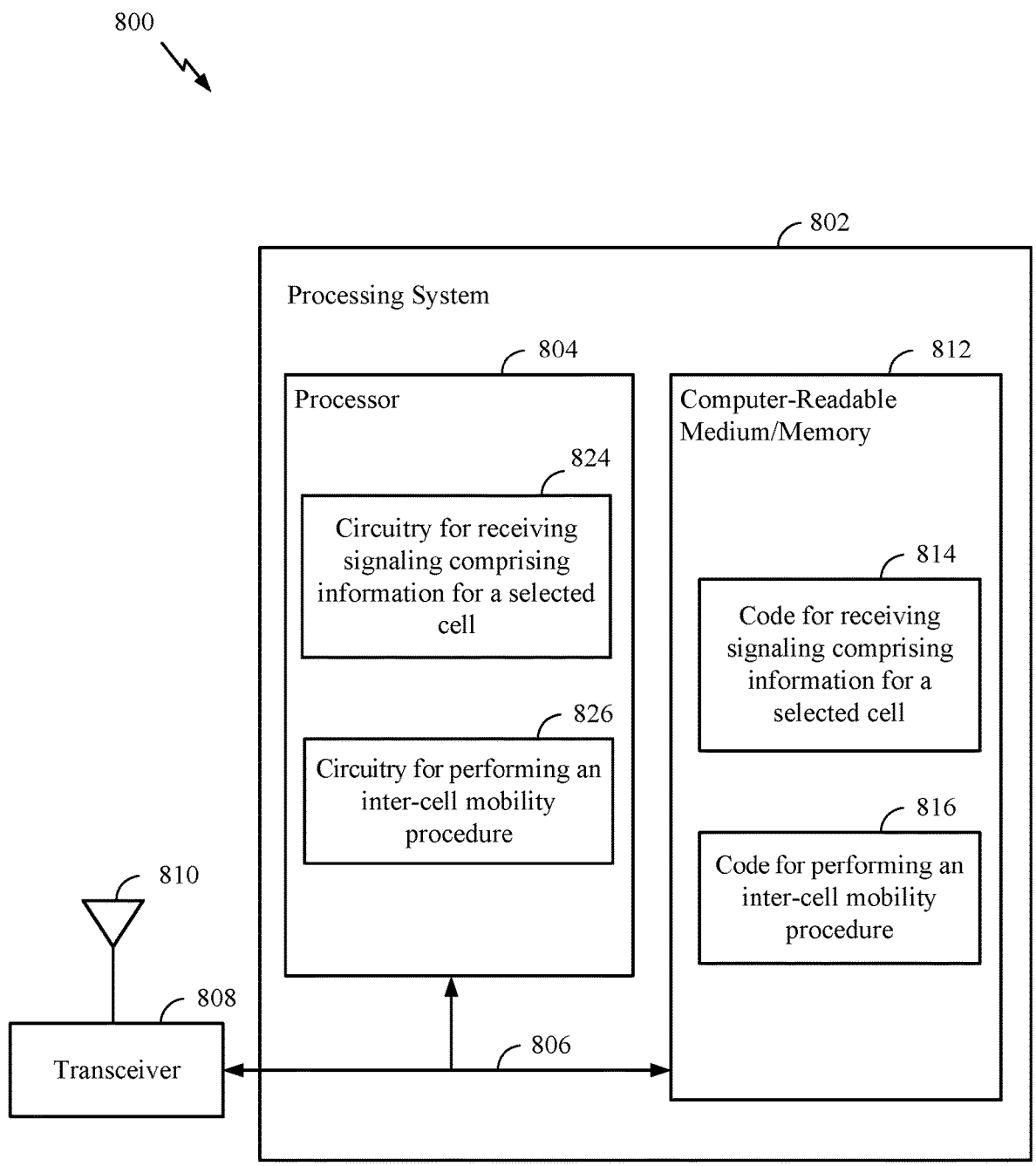
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for signaling of L1/L2 based cell selection. In certain aspects, computer-readable medium/memory 812 stores code 814 for receiving, from a network entity, at least one of physical layer signaling or medium access control (MAC) layer signaling comprising information for a selected cell; and code 816 for performing an inter-cell mobility procedure in accordance with the information for the selected cell. In certain aspects, the processor 804 has circuitry configured to implement the code stored in the computer-readable medium/memory 812. The processor 804 includes circuitry 824 for receiving, from a network entity, at least one of physical layer signaling or medium access control (MAC) layer signaling comprising information for a selected cell; and circuitry 826 for performing an inter-cell mobility procedure in accordance with the information for the selected cell.

For example, means for receiving may include a receive processor 458 and/or an antenna(s) 454 of the UE 120 illustrated in FIG. 2 and/or circuitry 824 for receiving of the communication device 800 in FIG. 8. Means for performing may include a processing system, which may include one or more processors, such as the transmit processor 464, the TX MIMO processor 466, the receive processor 458, and/or the controller/processor 480 of the UE 120 illustrated in FIG. 4 and/or the processing system 802 of the communication device 800 in FIG. 8.

Figure 9:
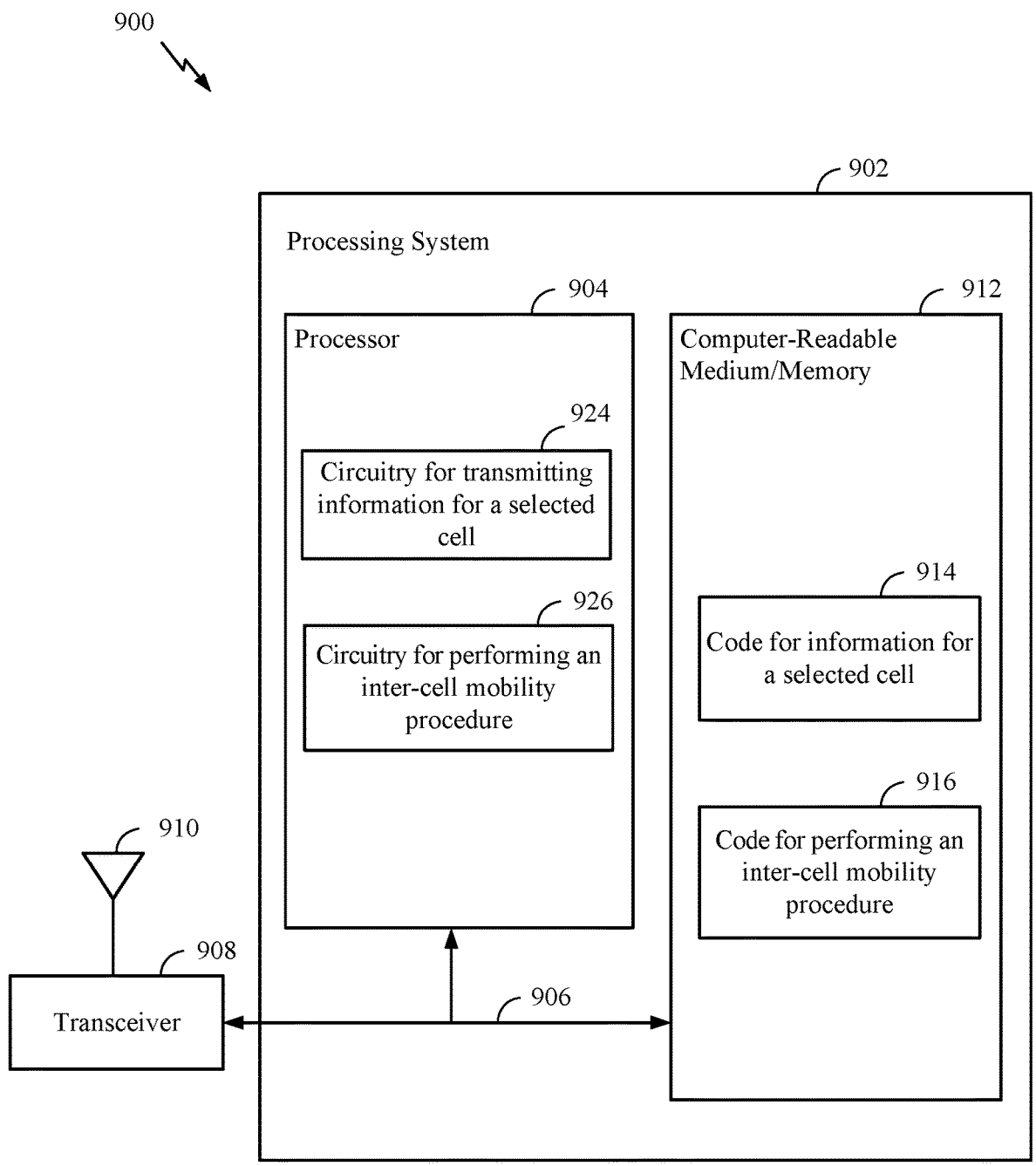
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for signaling of L1/L2 based cell selection. In certain aspects, computer-readable medium/memory 912 stores code 914 for transmitting, to a user equipment (UE) via at least one of physical layer signaling or medium access control (MAC) layer signaling, information for a selected cell; and code 916 performing an inter-cell mobility procedure with the UE in accordance with the information for the selected cell. In certain aspects, the processor 904 has circuitry configured to implement the code stored in the computer-readable medium/memory 912. The processor 904 includes circuitry 924 for transmitting, to a user equipment (UE) via at least one of physical layer signaling or medium access control (MAC) layer signaling, information for a selected cell; and circuitry 926 performing an inter-cell mobility procedure with the UE in accordance with the information for the selected cell.

For example, means for transmitting (or means for outputting for transmission) may include a transmit processor 420 and/or an antenna(s) 434 of the BS 110 illustrated in FIG. 4 and/or circuitry 924 for transmitting of the communication device 900 in FIG. 9. Means for performing may include a processing system, which may include one or more processors, such as the transmit processor 420, the TX MIMO processor 430, the receive processor 438, and/or the controller/processor 440 of the BS 110 illustrated in FIG. 4 and/or the processing system 902 of the communication device 900 in FIG. 9.

Example Aspects

In a first aspect, a method for wireless communications by a user equipment (UE), includes: receiving, from a network entity, at least one of physical layer signaling or medium access control (MAC) layer signaling comprising information for a selected cell; and performing an inter-cell mobility procedure in accordance with the information for the selected cell.

In second aspect, in combination with the first aspect, wherein the physical layer or MAC layer signaling comprises at least one of downlink control information (DCI) or a MAC control element (MAC CE) comprising the information for the selected cell.

In a third aspect, in combination with one or more of the first and second aspects, wherein the information for the selected cell comprises at least one of: a synchronization signal block (SSB) configuration; a subcarrier spacing (SCS) configuration; remaining minimum system information (RMSI); a random access configuration; or one or more rate matching patterns.

In a four aspect, in combination with one or more the first through third aspects, wherein the information for the selected cell comprises at least one of: a downlink and uplink time division duplex (TDD) configuration; a supplemental uplink (SUL) configuration; downlink and uplink cell frequency locations; a downlink and uplink bandwidth part (BWP) configuration; a configuration for at least one of a physical downlink control channel (PDCCH), physical downlink shared channel (PDSCH), physical uplink shared channel (PUSCH), physical uplink control channel (PUCCH), or sounding reference signal (SRS); a channel state information (CSI) measurement and reporting configuration; a timing advance group (TAG) identifier (ID); or a cross-carrier scheduling configuration.

In a fifth aspect, in combination with one or more the first through fourth aspects, wherein: the inter-cell mobility procedure comprises an addition or removal of the selected cell as a secondary cell (SCell); and the information for the selected cell comprises at least one of a serving cell identifier (ID) or a physical cell ID (PCI) for the SCell.

In a sixth aspect, in combination with one or more the first through fifth aspects, wherein the inter-cell mobility procedure comprises reselection of at least one of a primary cell (PCell) or a primary secondary cell group (SCG) cell (PSCell); and the information for the selected cell comprises at least one of a serving cell identifier (ID) or a physical cell ID (PCI) for PCell or PSCell.

In a seventh aspect, in combination with one or more the first through sixth aspects, wherein the information comprises at least one of a security key, ciphering, or integrity protection algorithm at least for the cell group of the reselected PCell or PSCell.

In an eighth aspect, in combination with one or more the first through seventh aspects, wherein: the inter-cell mobility procedure comprises activation or deactivation of one or more secondary cells (SCells); and the information comprises a bit map indicating which of the SCells are activated or deactivated.

In a ninth aspect, in combination with one or more the first through eighth aspects, wherein the selected cell comprises: a cell operated under a first distributed unit (DU) of a first central unit (CU) of a base station, the first DU and the first CU currently serving the UE; a cell operated under a second DU of the first CU of the base station, the first DU and the first CU currently serving the UE; or a cell operating under a third DU of a second CU of the first base station, the first DU and the first CU currently serving the UE.

In a tenth aspect, in combination with one or more the first through ninth aspects, wherein the selected cell comprises one of: (i) the cell operated under the second DU of the first CU of the base station, or (ii) the cell operating under the third DU of the second CU of the first base station, and wherein the information comprises at least one of: a radio bearer served by each radio link control (RLC) bearer; a configuration per RLC bearer; or a configuration per logic channel.

In an eleventh aspect, in combination with one or more the first through tenth aspects, wherein the selected cell comprises the cell operating under the third DU of a second CU of the first base station, and wherein the information comprises at least one of: a service data adaptation protocol (SDAP) and a packet data convergence protocol (PDCP) for configuring uplink and downlink communications between the UE and the second CU; and a mapping between a quality of service (QoS) flow to a data radio bearer (DRB).

In an twelfth aspect, in combination with one or more the first through eleventh aspects, wherein the selected cell comprises the cell operating under the third DU of the second CU of the first base station, and wherein: the inter-cell mobility procedure comprises at addition or removal of the selected cell as a primary secondary cell group (SCG) cell (PSCell); and the information for the selected cell comprises at least one of a serving cell identifier (ID) or a physical cell ID (PCI) for the PSCell.

In a thirteenth aspect, a method for wireless communication by a by a network entity, includes: transmitting, to a user equipment (UE) via at least one of physical layer signaling or medium access control (MAC) layer signaling, information for a selected cell; and performing an inter-cell mobility procedure with the UE in accordance with the information for the selected cell.

In fourteenth aspect, in combination with the thirteenth aspect, wherein the physical layer or MAC layer signaling comprises at least one of downlink control information (DCI) or a MAC control element (MAC CE) indicating the cell selection information.

In a fifteenth aspect, in combination with one or more of the thirteenth and fourteenth aspects, wherein the information for the selected cell comprises at least one of: a synchronization signal block (SSB) configuration; a subcarrier spacing (SCS) configuration; remaining minimum system information (RMSI); a random access configuration; or one or more rate matching patterns.

In a sixteenth aspect, in combination with one or more of the thirteenth through fifteenth aspects, wherein the information for the selected cell comprises at least one of: a downlink and uplink time division duplex (TDD) configuration; a supplemental uplink (SUL) configuration; downlink and uplink cell frequency locations; a downlink and uplink bandwidth (BWP) configuration; a configuration for at least one of a physical downlink control channel (PDCCH), physical downlink shared channel (PDSCH), physical uplink shared channel (PUSCH), physical uplink control channel (PUCCH), or sounding reference signal (SRS); a channel state information (CSI) measurement and reporting configuration; a timing advance group (TAG) identifier (ID); or a cross-carrier scheduling configuration.

In a seventeenth aspect, in combination with one or more of the thirteenth through sixteenth aspects wherein: the inter-cell mobility procedure comprises at addition or removal of the selected cell as a secondary cell (SCell); and the information for the selected cell comprises at least one of a serving cell identifier (ID) or a physical cell ID (PCI) for the SCell.

In an eighteenth aspect, in combination with one or more of the thirteenth through seventeenth aspects, wherein: the inter-cell mobility procedure comprises reselection of at least one of a primary cell (PCell) or a primary secondary cell group (SCG) cell (PSCell); and the information for the selected cell comprises at least one of a serving cell identifier (ID) or a physical cell ID (PCI) for PCell or PSCell.

In a nineteenth aspect, in combination with one or more of the thirteenth through eighteenth aspects, wherein the information comprises at least one of a security key, ciphering, or integrity protection algorithms at least for the cell group of the reselected PCell or PSCell.

In a twentieth aspect, in combination with one or more of the thirteenth through nineteenth aspects, wherein: the inter-cell mobility procedure comprises activation or deactivation of one or more secondary cells (SCells); and the information comprises a bit map indicating which of the SCells are activated or deactivated.

In a twenty-first aspect, in combination with one or more of the thirteenth through twentieth aspects, wherein the selected cell comprises: a cell operated under a first distributed unit (DU) of a first central unit (CU) of a base station, the first DU and the first CU currently serving the UE; a cell operated under a second DU of the first CU of the base station, the first DU and the first CU currently serving the UE; or a cell operating under a third DU of a second CU of the first base station, the first DU and the first CU currently serving the UE.

In a twenty-second aspect, in combination with one or more of the thirteenth through twenty-first aspects, wherein the selected cell comprises one of: (i) the cell operated under the second DU of the first CU of the base station, or (ii) the cell operating under the third DU of the second CU of the first base station, and wherein the information comprises at least one of: a radio bearer served by each radio link control (RLC) bearer; a configuration per RLC bearer; or a configuration per logic channel.

In a twenty-third aspect, in combination with one or more of the thirteenth through twenty-second aspects, wherein the selected cell comprises the cell operating under the third DU of a second CU of the first base station, and wherein the information comprises at least one of: a service data adaptation protocol (SDAP) and a packet data convergence protocol (PDCP) for configuring uplink and downlink communications between the UE and the second CU; and a mapping between a quality of service (QoS) flow to a data radio bearer (DRB).

In a twenty-fourth aspect, in combination with one or more of the thirteenth through twenty-third aspects, wherein the selected cell comprises the cell operating under the third DU of the second CU of the first base station, and wherein: the inter-cell mobility procedure comprises at addition or removal of the selected cell as a Primary secondary cell group (SCG) cell (PSCell); and the information for the selected cell comprises at least one of a serving cell identifier (ID) or a physical cell ID (PCI) for the PSCell.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
  receiving, from a network entity, at least one of physical layer signaling or medium access control (MAC) layer signaling comprising information for a selected cell, wherein the selected cell comprises a cell operating under a distributed unit (DU) of the network entity, wherein the DU currently serves the UE, and wherein the information for the selected cell comprises at least one of:
    a synchronization signal block (SSB) configuration;
    one or more rate matching patterns;
    a supplemental uplink (SUL) configuration;
    a downlink and uplink bandwidth part (BWP) configuration; or
    a cross-carrier scheduling configuration; and
  performing an inter-cell mobility procedure in accordance with the information for the selected cell.

2. The method of claim 1, wherein the physical layer or MAC layer signaling comprises at least one of downlink control information (DCI) or a MAC control element (MAC CE) comprising the information for the selected cell.

3. The method of claim 1, wherein the information for the selected cell further comprises at least one of:
  a subcarrier spacing (SCS) configuration;
  remaining minimum system information (RMSI); or
  a random access configuration.

4. The method of claim 1, wherein the information for the selected cell further comprises at least one of:
  a downlink and uplink time division duplex (TDD) configuration;
  downlink and uplink cell frequency locations;
  a configuration for at least one of a physical downlink control channel (PDCCH), physical downlink shared channel (PDSCH), physical uplink shared channel (PUSCH), physical uplink control channel (PUCCH), or sounding reference signal (SRS);
  a channel state information (CSI) measurement and reporting configuration; or
  a timing advance group (TAG) identifier (ID).

5. The method of claim 1, wherein:
  the inter-cell mobility procedure comprises an addition or removal of the selected cell as a secondary cell (SCell); and
  the information for the selected cell further comprises at least one of a serving cell identifier (ID) or a physical cell ID (PCI) for the SCell.

6. The method of claim 1, wherein:
  the inter-cell mobility procedure comprises reselection of at least one of a primary cell (PCell) or a primary secondary cell group (SCG) cell (PSCell); and
  the information for the selected cell further comprises at least one of a serving cell identifier (ID) or a physical cell ID (PCI) for PCell or PSCell.

7. The method of claim 6, wherein the information further comprises at least one of a security key, ciphering, or integrity protection algorithm at least for the cell group of the reselected PCell or PSCell.

8. The method of claim 1, wherein:
  the inter-cell mobility procedure comprises activation or deactivation of one or more secondary cells (SCells); and
  the information further comprises a bit map indicating which of the SCells are activated or deactivated.

9. A user equipment (UE), comprising:
  a memory; and
  a processor communicatively coupled to the memory, the processor and the memory configured to cause the UE to:
    receive, from a network entity, at least one of physical layer signaling or medium access control (MAC) layer signaling comprising information for a selected cell, wherein the selected cell comprises a cell operating under a distributed unit (DU) of the network entity, wherein the DU currently serves the UE, and wherein the information for the selected cell comprises at least one of:
      a synchronization signal block (SSB) configuration;
      one or more rate matching patterns;
      a supplemental uplink (SUL) configuration;
      a downlink and uplink bandwidth part (BWP) configuration; or
      a cross-carrier scheduling configuration; and
    perform an inter-cell mobility procedure in accordance with the information for the selected cell.

10. The UE of claim 9, wherein the physical layer or MAC layer signaling comprises at least one of downlink control information (DCI) or a MAC control element (MAC CE) comprising the information for the selected cell.

11. The UE of claim 9, wherein the information for the selected cell further comprises at least one of:
   a subcarrier spacing (SCS) configuration;
   remaining minimum system information (RMSI); or
   a random access configuration.

12. The UE of claim 9, wherein the information for the selected cell further comprises at least one of:
   a downlink and uplink time division duplex (TDD) configuration;
   downlink and uplink cell frequency locations;
   a configuration for at least one of a physical downlink control channel (PDCCH), physical downlink shared channel (PDSCH), physical uplink shared channel (PUSCH), physical uplink control channel (PUCCH), or sounding reference signal (SRS);
   a channel state information (CSI) measurement and reporting configuration; or
   a timing advance group (TAG) identifier (ID).

13. A method for wireless communications by a network entity, comprising:
   transmitting, to a user equipment (UE) via at least one of physical layer signaling or medium access control (MAC) layer signaling, information for a selected cell, wherein the selected cell comprises a cell operating under a distributed unit (DU) of the network entity, wherein the DU currently serves the UE, and wherein the information for the selected cell comprises at least one of:
      a synchronization signal block (SSB) configuration;
      one or more rate matching patterns;
      a supplemental uplink (SUL) configuration;
      a downlink and uplink bandwidth part (BWP) configuration; or
      a cross-carrier scheduling configuration; and
   performing an inter-cell mobility procedure with the UE in accordance with the information for the selected cell.

14. The method of claim 13, wherein the physical layer or MAC layer signaling comprises at least one of downlink control information (DCI) or a MAC control element (MAC CE) indicating the cell selection information.

15. The method of claim 13, wherein the information for the selected cell further comprises at least one of:
   a subcarrier spacing (SCS) configuration;
   remaining minimum system information (RMSI); or
   a random access configuration.

16. The method of claim 13, wherein the information for the selected cell further comprises at least one of:
   a downlink and uplink time division duplex (TDD) configuration;
   downlink and uplink cell frequency locations;
   a configuration for at least one of a physical downlink control channel (PDCCH), physical downlink shared channel (PDSCH), physical uplink shared channel (PUSCH), physical uplink control channel (PUCCH), or sounding reference signal (SRS);
   a channel state information (CSI) measurement and reporting configuration; or
   a timing advance group (TAG) identifier (ID).

17. The method of claim 13, wherein:
   the inter-cell mobility procedure comprises addition or removal of the selected cell as a secondary cell (SCell); and
   the information for the selected cell further comprises at least one of a serving cell identifier (ID) or a physical cell ID (PCI) for the SCell.

18. The method of claim 13, wherein:
   the inter-cell mobility procedure comprises reselection of at least one of a primary cell (PCell) or a primary secondary cell group (SCG) cell (PSCell); and
   the information for the selected cell further comprises at least one of a serving cell identifier (ID) or a physical cell ID (PCI) for PCell or PSCell.

19. The method of claim 18, wherein the information further comprises at least one of a security key, ciphering, or integrity protection algorithms at least for the cell group of the reselected PCell or PSCell.

20. The method of claim 13, wherein:
   the inter-cell mobility procedure comprises activation or deactivation of one or more secondary cells (SCells); and
   the information further comprises a bit map indicating which of the SCells are activated or deactivated.

21. A network entity, comprising:
   a memory; and
   a processor communicatively coupled to the memory, the processor and the memory configured to cause the network entity to:
   transmit, to a user equipment (UE) via at least one of physical layer signaling or medium access control (MAC) layer signaling, information for a selected cell, wherein the selected cell comprises a cell operating under a distributed unit (DU) of the network entity, wherein the DU currently serves the UE, and wherein the information for the selected cell comprises at least one of:
      a synchronization signal block (SSB) configuration;
      one or more rate matching patterns;
      a supplemental uplink (SUL) configuration;
      a downlink and uplink bandwidth part (BWP) configuration; or
      a cross-carrier scheduling configuration; and
   perform an inter-cell mobility procedure with the UE in accordance with the information for the selected cell.

22. The method of claim 1, wherein the information for the selected cell further comprises:
   a synchronization signal block (SSB) configuration; and
   one or more rate matching patterns.

23. The method of claim 1, wherein the information for the selected cell further comprises:
   a supplemental uplink (SUL) configuration;
   a downlink and uplink bandwidth part (BWP) configuration; and
   a cross-carrier scheduling configuration.

24. The network entity of claim 21, wherein the physical layer or MAC layer signaling comprises at least one of downlink control information (DCI) or a MAC control element (MAC CE) comprising the information for the selected cell.

25. The network entity of claim 21, wherein the information for the selected cell further comprises at least one of:
   a subcarrier spacing (SC S) configuration;
   remaining minimum system information (RMSI); or
   a random access configuration.

26. The network entity of claim 21, wherein the information for the selected cell further comprises at least one of:
   a downlink and uplink time division duplex (TDD) configuration;
   downlink and uplink cell frequency locations;
   a configuration for at least one of a physical downlink control channel (PDCCH), physical downlink shared channel (PDSCH), physical uplink shared channel (PUSCH), physical uplink control channel (PUCCH), or sounding reference signal (SRS);

a channel state information (CSI) measurement and reporting configuration; or a timing advance group (TAG) identifier (ID).

* * * * *